Oct. 20, 1936.　　　D. B. BENHAM　　　2,057,875
UNIVERSAL JOINT
Filed Jan. 16, 1936
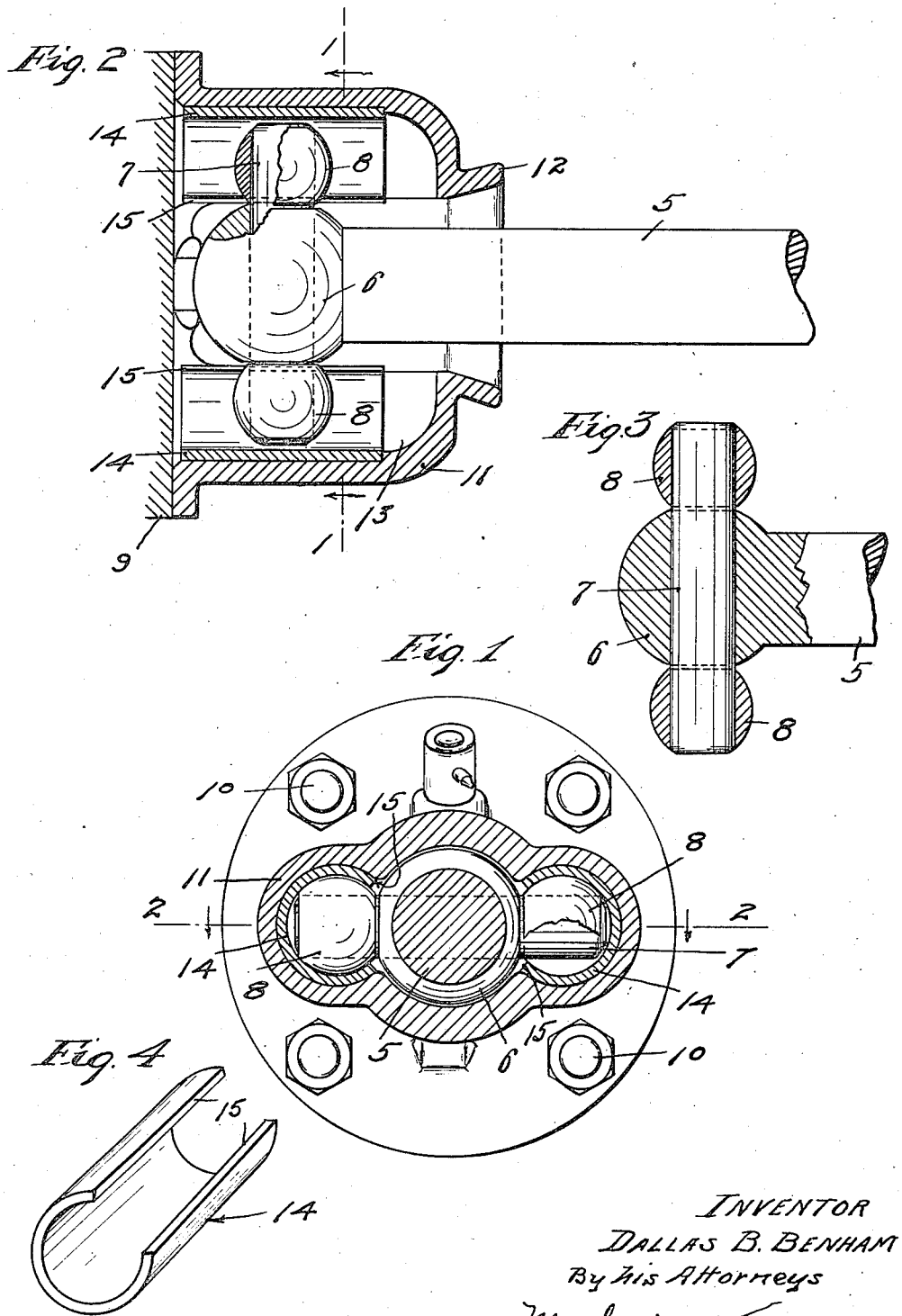
INVENTOR
DALLAS B. BENHAM
By his Attorneys
Merchant & Kilgore Patented Oct. 20, 1936

2,057,875

UNITED STATES PATENT OFFICE 2,057,875

UNIVERSAL JOINT

Dallas B. Benham, Minneapolis, Minn.

Application January 16, 1936, Serial No. 59,374

1 Claim. (Cl. 64—8)

My invention relates to universal joints such as used, for example, to transmit power from the transmission mechanism, to the differential gears of an automobile, and, generally stated, the invention has for its object to improve the structure of such or similar universal joints. The invention makes possible quick repairs of worn universal joints already in use, and where the invention is primarily incorporated in the universal joint, it makes possible a better and longer wearing structure which is also capable of easier and better repair when worn.

The invention is illustrated in the accompanying drawing wherein like characters indicate like parts throughout the several views.

Referring to the drawing:

Fig. 1 shows a commercial form of the universal joint, some of the parts being sectioned on the line 1—1 of Fig. 2 and some parts being shown in full;

Fig. 2 shows the universal joint partly in plan, but with some parts in section on the line 2—2 of Fig. 1;

Fig. 3 shows the transmission shaft and roller-equipped pin at the head thereof, some parts being in section and some parts being shown in full; and Fig. 4 is a perspective showing one of the longitudinally slotted bushings removed from working position.

Before directing attention to the features of my invention, I will first describe a structure to which it is applied and which structure, minus my improvement, is such as is now quite generally used as a universal joint in automobiles, and in fact, in various other places. Describing this older structure, the numeral 5 shows one end of a transmission shaft for conveying the power of the engine to the differential at the rear of the automobile. This shaft 5 is provided with a head 6 through which is tightly driven a strong torque transmitting pin 7, on the projecting ends of which are mounted spherical rollers 8. The numeral 9 indicates what may be assumed either to be a driving or driven rotary member and to which is secured by suitable means, such as by nut-equipped bolts 10, a flanged socket-forming shell 11 provided with a quite large axial neck-like opening 12 through which the shaft 5 works with ample clearance. Internally, the socket-forming shell 11 is formed with diametrically opposite longitudinally extended parallel ball runways 13. These ball runways 13 are cylindrical, except that they are not complete cylinders in that they are open at their spaced facing sides so that there is ample clearance for travelling and angular movements of the pins 7 when rollers 8 were arranged to work directly in the cylindrical runways 13.

The ball runways 13 in the assembled device, are closed by the member 9, but are otherwise open for the assembly of the elements of the universal joint.

In accordance with my invention, the rollers 8 do not work directly within the runways 13. On the contrary, my invention provides longitudinally slotted cylindrical metal bushings 14 that are driven or pressed (not necessarily under any considerable pressure) into the hitherto used runways 13 (which here afford bushing-receiving channels). The open sides or longitudinal slots 15 of these bushings, of course, face each other and align with the open sides of the old runways 13 so that the clearance is afforded for the movements of the pin 7 and its rollers 8. These bushings 14 are preferably of hardened or tempered steel so that they afford the best kind of bearing surface for the travelling and rolling movements of the spherical rollers 8 therein. These bushings may be made and hardened or tempered at comparatively small cost and, moreover, it is not necessary nor, in fact, desirable that the seating runways 13 be machined or finished with ground surfaces. In fact, the use of the bushings, instead of adding to the cost of the universal joint, makes the cost of the complete structure less than the cost of the older structure. This is partly because of the fact that the bushings may be accurately made and cheaply finished, and further because their application increases the strength of the casing and makes it possible to use a lighter casing and even a casing that may be cold pressed.

From what has been said, it will be understood that the bushings may be and preferably will be applied in the socket or housing of the universal joint in the initial manufacture thereof, but that the bushings may be applied later to worn universal joints of older structures. In any case, the use of the bushings makes repairs due to wear a very simple and easy matter.

It will be noted that the projecting ends of the pin 7 afford the head of the shaft 5 with diametrically opposite projecting trunnions. In the drawing and particularly in Fig. 1, clearance between the spherical rollers 8 and the bushings 14 is not shown, but in practice, there would be a very slight clearance, advisably of about two or three thousandths of an inch, or just enough to avoid friction without permitting much backlash. It will, of course, be understood that in the transmitting action, the spherical rollers will run with very slight friction in the bushings to compensate for angularity in the transmission elements and can move back and forth in the bushings within certain limits, which is much less than the length of the bushing. The torque of the transmission is therefore transmitted with the minimum of friction.

What I claim is:

In a universal joint, a shell having parallel run ways shaped as cylindrical walled segments having open sides opposed to one another and diametrically spaced, bearing bushings of corresponding cylindrical segmental configuration normally immovably fitted in said run ways, but adapted for removal when worn, and a shaft having spherical rollers operatively engaged with said bushings.

DALLAS B. BENHAM.